US008099715B2

(12) United States Patent
Hisaki

(10) Patent No.: US 8,099,715 B2
(45) Date of Patent: Jan. 17, 2012

(54) SERVICE-BASED SOFTWARE DESIGNING ASSISTANCE METHOD AND APPARATUS THEREOF

(75) Inventor: Kazuya Hisaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1312 days.

(21) Appl. No.: 11/785,061

(22) Filed: Apr. 13, 2007

(65) Prior Publication Data

US 2007/0294670 A1 Dec. 20, 2007

(30) Foreign Application Priority Data

Jun. 15, 2006 (JP) .................................. 2006-165568

(51) Int. Cl.
*G06F 9/44* (2006.01)
(52) U.S. Cl. ......................... 717/120; 717/121; 717/170
(58) Field of Classification Search .................. 717/101, 717/120, 121, 170
See application file for complete search history.

(56) References Cited

U.S. PATENT DOCUMENTS

| | | | | |
|---|---|---|---|---|
| 5,649,200 A | * | 7/1997 | Leblang et al. | 717/122 |
| 5,675,802 A | * | 10/1997 | Allen et al. | 717/103 |
| 5,794,042 A | * | 8/1998 | Terada et al. | 717/101 |
| 6,438,743 B1 | * | 8/2002 | Boehm et al. | 717/122 |
| 6,457,170 B1 | * | 9/2002 | Boehm et al. | 717/106 |
| 7,266,826 B2 | * | 9/2007 | Katiyar et al. | 719/316 |
| 7,428,726 B1 | * | 9/2008 | Cowan et al. | 717/122 |
| 7,437,717 B1 | * | 10/2008 | Cowan et al. | 717/131 |
| 7,448,034 B2 | * | 11/2008 | Anderson et al. | 717/176 |
| 7,506,337 B2 | * | 3/2009 | Iyer | 717/177 |
| 2005/0268283 A1 | * | 12/2005 | Clemm et al. | 717/121 |
| 2006/0212857 A1 | * | 9/2006 | Neumann et al. | 717/140 |
| 2007/0006176 A1 | * | 1/2007 | Spil et al. | 717/135 |

FOREIGN PATENT DOCUMENTS

| | | |
|---|---|---|
| JP | 10-222357 | 8/1998 |
| JP | 2005-317007 | 11/2005 |
| JP | 2006-350729 | 12/2006 |

OTHER PUBLICATIONS

N.C Narendra, Flexible Support and Management of Adaptive Workflow Processes, 2004, 2004 Kluwer Academic Publishers, Information Systems Frontiers 6:3, pp. 247-262, <http://www.springerlink.com/content/I846x2q1l1138h0t/fulltext.pdf>.*

(Continued)

*Primary Examiner* — Thuy Dao
*Assistant Examiner* — Cuong V Luu
(74) *Attorney, Agent, or Firm* — McDermott Will & Emery LLP

(57) ABSTRACT

In a method and an apparatus of providing effective input/output data connections between services, for reducing load on a designer when designing service-based software application, which is described by a process flow language, there are provided the following means or steps: while storing connection histories of input/output data of the service within the software designing made in the past, selection is made arbitrarily on an output(s) of other service, which is/are connectable with all the inputs of the service selected, from selection information of the service becoming the service process flow describing only the processing order and a process target, conducting a process for driving production probability of connection combination of the input and the output from the connection histories, on all of the connection combinations, and outputting the connection combination(s) being high in the production probability extracted among of them.

2 Claims, 7 Drawing Sheets

OTHER PUBLICATIONS

Tien N. Nguyen, Model-based Version and Configuration Management for a Web Engineering Lifecycle, May 23-26, 2006, ACM 1-59593-323-9/06/0005, pp. 437-446, <http://dl.acm.org/citation.cfm?id=1135777.1135842&coll=DL&dl=GUIDE&CFID=38517906&CFTOKEN=53499044>.*

Shawren Singh, An Overview of Systems Design and Development Methologies with regard to the Invonlvement of Users and Other Stakeholders, 2003 SAICSIT, pp. 37-47, <http://dl.acm.org/citation.cfm?id=954014.954019&coll=DL&dl=GUIDE&CFID=38517906&CFTOKEN=53499044>.*

W M P van der Aalst, Dealing with workflow change: identification of issues and solutions, 2000, vol. 15 No. 5 Sep. 2000, Comput Syst Sci & Eng (200) 5: 267-276 @ 2000 CRL Publishing Ltd, <http://citeseerx.ist.psu.edu>.*

* cited by examiner

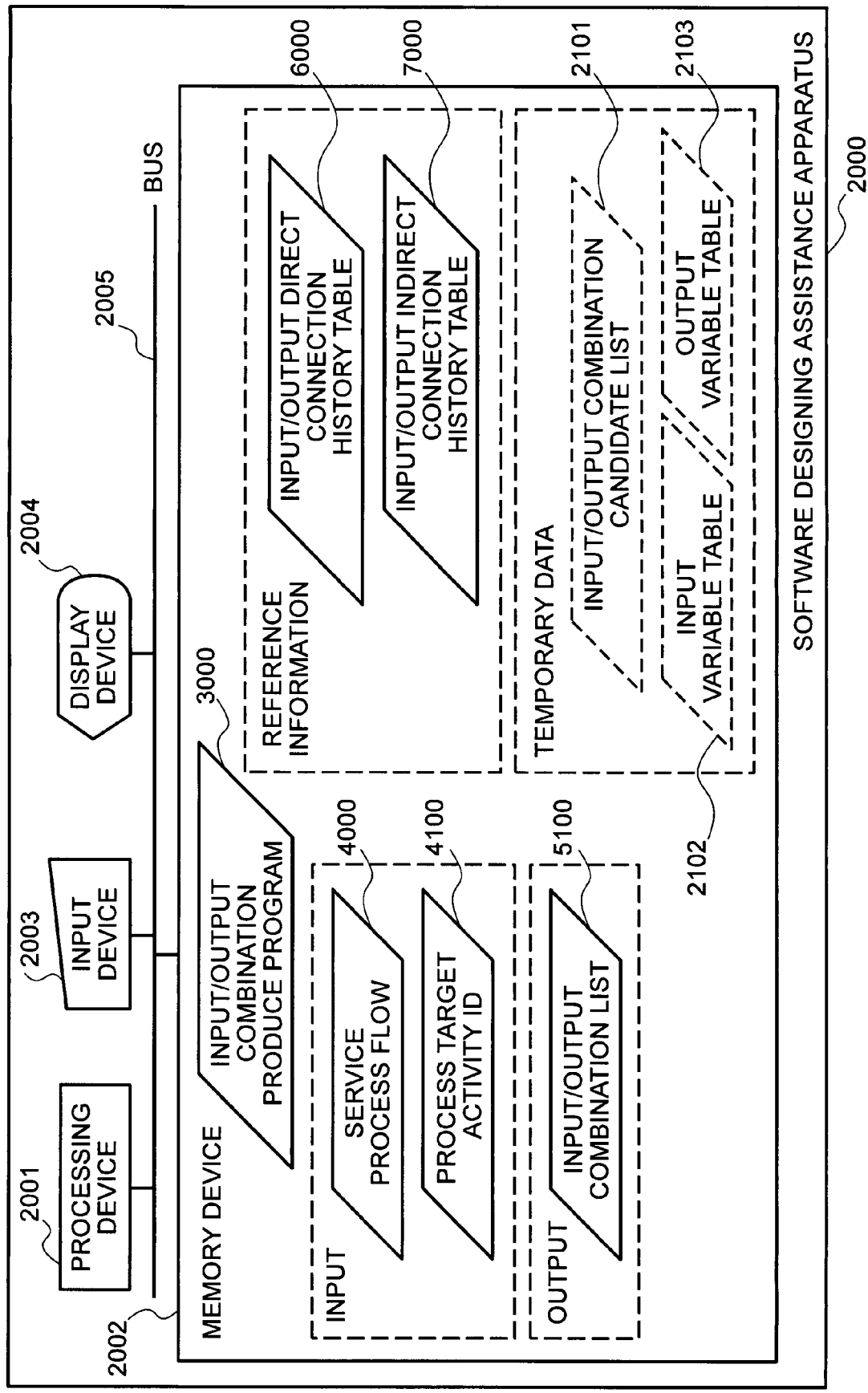

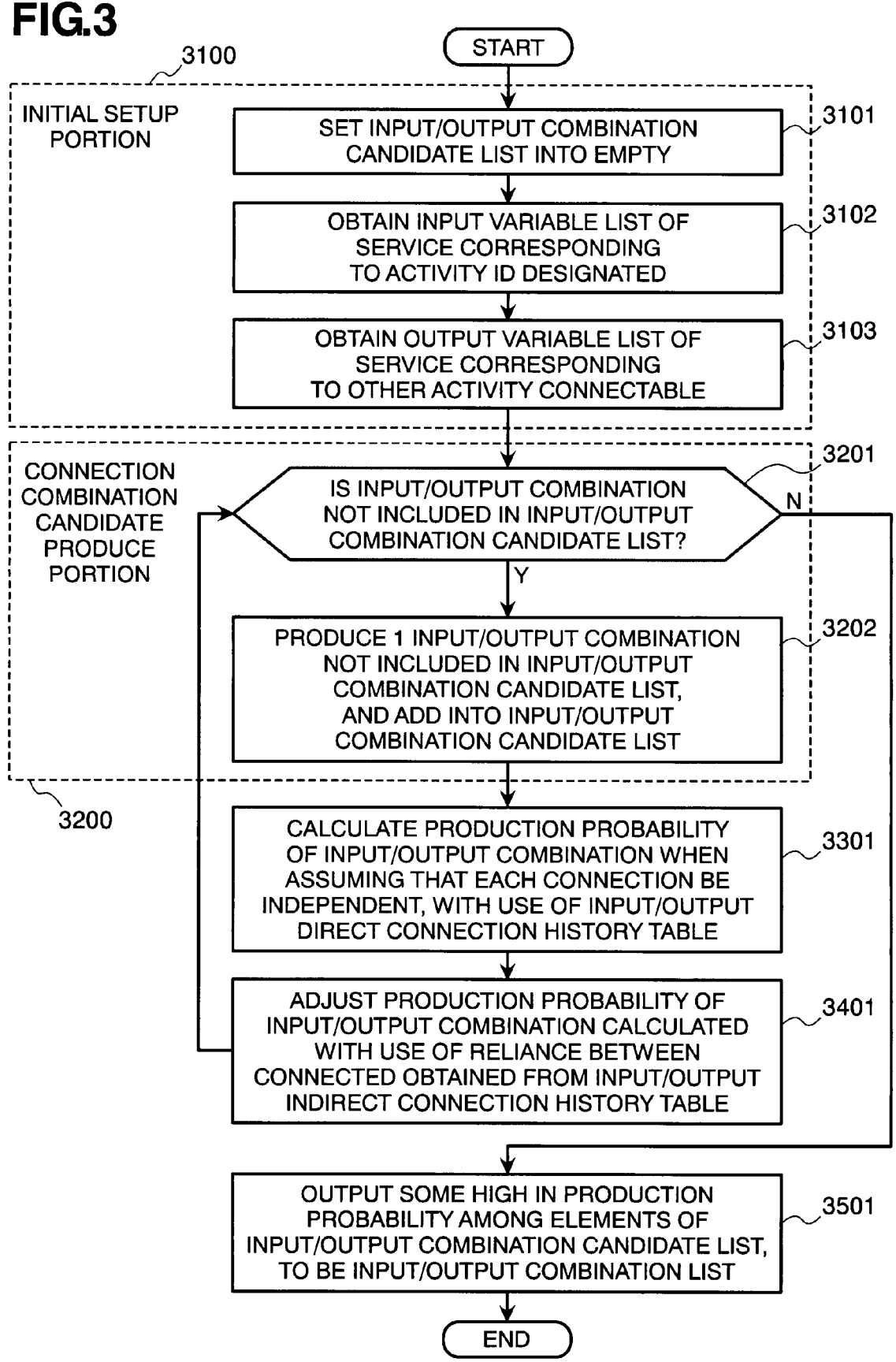

FIG.4

| ACTIVITY ID | SERVICE NAME | INPUT VARIABLE LIST | OUTPUT VARIABLE LIST | TRANSITION DESTINATION ACTIVITY ID |
|---|---|---|---|---|
| START | — | — | — | 1 |
| 1 | CUSTOMER INFORMATION SEARCH | CUSTOMER ID | CUSTOMER ID, COMMODITY NAME | 2 |
| 2 | COMMODITY PRICE SEARCH | COMMODITY NAME | ADDRESS, CARD NUMBER | 3 |
| 3 | CREDIT CHECK | CARD NUMBER, PAID AMOUNT | PRICE | 4 |
| 4 | COMMODITY DELIVERY | ADDRESS, COMMODITY NAME | YES/NO | END |
| END | — | DELIVERY ID | DELIVERY ID | — |

4001 ACTIVITY ID
4002 SERVICE NAME
4003 INPUT VARIABLE LIST
4004 OUTPUT VARIABLE LIST
4005 TRANSITION DESTINATION ACTIVITY ID
4010

FIG.5

| OUTPUT SERVICE NAME 5001 | OUTPUT VARIABLE NAME 5002 | INPUT SERVICE NAME 5003 | INPUT VARIABLE NAME 5004 |
|---|---|---|---|
| CUSTOMER INFORMATION SEARCH | CARD NUMBER | CREDIT CHECK | CARD NUMBER |
| COMMODITY INFORMATION SEARCH | PRICE | CREDIT CHECK | PAID AMOUNT |
| INPUT/OUTPUT COMBINATION PROBABILITY | | | 0.8 |

FIG.6

| OUTPUT SERVICE NAME 6001 | OUTPUT VARIABLE NAME 6002 | INPUT SERVICE NAME 6003 | INPUT VARIABLE NAME 6004 | NUMBER OF TIMES OF CONNECTIONS 6005 |
|---|---|---|---|---|
| CUSTOMER INFORMATION SEARCH | CARD NUMBER | CREDIT CHECK | CARD NUMBER | 20 |
| COMMODITY PRICE SEARCH | PRICE | CREDIT CHECK | PAID AMOUNT | 15 |
| | | | TOTAL NUMBER OF TIMES | 300 |

FIG.7

| SERVICE NAME A 7001 | OUTPUT PARAMETER NAME A 7002 | SERVICE NAME B 7003 | OUTPUT PARAMETER NAME B 7004 | NUMBER OF TIMES OF CONNECTIONS 7005 |
|---|---|---|---|---|
| CUSTOMER INFORMATION SEARCH | CARD NUMBER | COMMODITY PRICE SEARCH | PRICE | 14 |
| CUSTOMER INFORMATION SEARCH | ADDRESS | COMMODITY PRICE SEARCH | PRICE | 1 |
| | | | TOTAL NUMBER OF TIMES | 400 |

| RECORD NUMBER 8001 | VARIABLE NAME 8002 | OUTPUT VARIABLE RECORD NUMBER 8003 |
|---|---|---|
| 1 | CARD NUMBER | 1 |
| 1 | PAID AMOUNT | 1 |

| RECORD NUMBER 9001 | SERVICE NAME 9002 | VARIABLE NAME 9003 |
|---|---|---|
| 1 | (OUTSIDE) | CUSTOMER ID |
| 2 | (OUTSIDE) | COMMODITY NAME |
| 3 | CUSTOMER INFORMATION SEARCH | ADDRESS |
| 4 | CUSTOMER INFORMATION SEARCH | CARD NUMBER |
| 5 | COMMODITY PRICE SEARCH | PAID AMOUNT |

SERVICE-BASED SOFTWARE DESIGNING ASSISTANCE METHOD AND APPARATUS THEREOF

BACKGROUND OF THE INVENTION

The present invention relates to a method for designing software by combining Web service and/or component, etc., as being software parts (hereinafter, being called "service", collectively), each being manufactured to be a part or component by taking the reuse thereof into the consideration (hereinafter, being called "service-based software designing"), and it relates in particular, to a service-based software designing assistance method for assisting buildup of connection and/or combination of the input/output variables between the services, within a software part, as well as, an apparatus for that.

Conventionally, upon the designing the software, which is built up by combining services, a large number of trials are made to enables to describe the operation specification of the software in such the form that can be easily understood by a designer, describing the processing order of each of the services within the software by using a process flow language, such as, BPMN (Business Process Modeling Notation) or BPEL4WS (Business Process Execution Language for Web Services), etc., and thereby increasing the efficiency of the software designing. However, when exchanging of data, each being produced by each service, in other words, when producing the data flow thereof, in general, it is necessary for the designer to study on the input/output variables of the services, respectively, and to make correspondences. i.e., substituting or assigning data obtained from an output variable of a certain service into an input variable of other service, therefore, there is still a drawback of taking man-hour.

Then, with the software designing upon basis of such the service as mentioned above, as is already known by the Patent Document 1 (Japanese Patent Laying-Open No. Hei 10-222357 (1998) and the Patent Document 2 (Japanese Patent Laying-Open No. 2005-317007 (2005), for example, there are proposed a several number of methods for conducting the correspondence on the input and the output between the services.

Thus, in the Patent Document 1 are proposed a software constructing method and a system for building up a software with reusing data, wherein a data name, which a designer necessitates, is inputted, after storing metadata for making correspondence or relationship between the data name within services and an input/output interface, then the service for providing that is searched out from the metadata to be illustrated with an icon, and thereby graphically connecting communications of data between the services by a link.

Also, in the Patent Document 2 are proposed a work flow automatic producing system, and a workflow analyzing and controlling system, wherein search is made on services filling up with a restriction condition, upon basis of the specification requested by the designer, while storing therein restriction conditions, such as, input/output data and/or performances to be filled up with for each service, for example, in advance, as a knowledge database, so as to produce a workflow by combining them, and further thereafter, simulation is made upon the flow of data with producing the petri net thereof, corresponding to that workflow produced, and thereby selecting a most suitable candidate in throughput thereof.

SUMMARY OF THE INVENTION

As was mentioned above, also with the conventional arts, there are already proposed the methods for lightening or reducing the load on the designer when she/he makes correspondence or relationship of the input/output between the services, within the service-based software designing, and then, with applying it therein, it is possible to expect reduction of a man-hour for that designing.

However, in case when applying the method known by the Patent Document 1 mentioned above therein, although with displaying of the services with the icons and illustrating of the connection between the input/output data with the link, it is possible to provide a graphical operating environment, and thereby enabling to make the correspondence or relationship between the input/output easy for the designer, however the correspondence or relationship itself must be conducted manually, by a hand of the designer, in the similar manner to the conventional arts.

On the other hand, in case when applying the method known by the Patent Document 2 mentioned above therein, automatic production is made on the workflow, connecting the input/output data between the services, to satisfy the restriction conditions of each of the services, which are stored in the knowledge database, as well as, the specification required by the designer, so that only that having a good result is provided, thereby lightening or reducing the load on the designer. However, contents of the restriction of the input/output data on the knowledge database, which are described in that Patent Document, they are assumed to be only a formal restriction, such as, a type of service, etc. For that reason, it is impossible to exclude connection, which can be made formally, but should not be made, actually. Similarly, it is impossible to exclude even such connection of the input/output data that will not be connected within the actual software designing, and therefore it still forces a load on the designer.

Then, according to the present invention, being accomplished by taking the problems of the conventional arts mentioned above into the consideration thereof, i.e., an object thereof is to provide a service-based software designing assistance method and an apparatus for the same, enabling to build up a combination of connections of input/output variables, between the services within the software parts, for lightening or reducing the load on the designer within the designing of the service-based application, in which description is made by a language of process flow.

According to the present invention, for accomplishing the objection mentioned above, first of all, there is provided a service-based software designing assistance method, for assisting designing of software by combining a plural number of services, being parts of software for executing specific functions, comprising the following steps of: inputting a service process flow defining a processing order of one or more of said services in a combination thereof; providing respective data to one or more of input variables, which are owned by designated one of the services, targeting the service process flow inputted; and making correspondence for output variables of services, one by one, existing prior to said services designated, thereby assisting software designing, and further, producing all possible combinations of said correspondences for all of the input variables, which are owned by said service designated; calculating a production probability about said combinations produced, upon basis of a history information of software designing made in a past; and extracting a combination, said calculated production probability of which fulfills a predetermined condition, thereby to be outputted.

Also, according to the present invention, within the service-based software designing assistance method, as described in the above, preferably, as said history information of the software designing made in the past is included a direct connection history, recording a number of times therein of making correspondence between the input variables of an arbitrary one of the services and the output variables of other arbitrary one thereof, within the software designing made in the past, in combination with a title of the input variable, a title of the output variable, a title of the service having said input variable, and a title of the service having said output variable, or preferably, as said history information of the software designing made in the past is further included an indirect connection history, recording a number of times therein of making correspondences between each of plural numbers of the input variables of an arbitrary service, having said plural numbers of the input variables, and plural numbers of the output variables of the other arbitrary service, within the software designing made in the past, in combination with a title of one output of plural numbers of said input variables, a title of the service having said one output, a title of other output differing from said one output of said output variables, and a title of the service having said other output.

In addition thereto, according to the present invention, also for accomplishing the object mentioned above, there is further provided a service-based software designing assistance apparatus, for assisting designing of software by combining a plural number of services, being parts of software for executing specific functions, comprising: a memory device, which is configured to store connection history information of input/output data of a service within software designing made in a past; an input portion, which is configured to input a service process flow defining a processing order with combining one or more of said services, and to select an arbitrary service within said service process flow inputted; a processing device, which is configured to produce all possible combinations of correspondences, for all input variables owned by the arbitrary service, which is selected by said input portion, and to calculate a production probability about said combinations produced, upon basis of the connection history information of the input/output data of the service within the software designing made in the past, which is stored in said memory device; and an output portion, which is configured to output fulfilling a predetermined condition, upon basis of said production probability, which is calculated by said processing device.

Further, according to the present invention, within the service-based software designing assistance apparatus, as described in the above, preferably said memory device comprises: a direct connection history table, which is configure to record a number of times therein of making correspondence between the input variables of an arbitrary one of the services and the output variables of other arbitrary one thereof, within the software designing made in the past, in combination with a title of the input variable, a title of the output variable, a title of the service having said input variable, and a title of the service having said output variable; and further an indirect connection history table, which is configured to record a number of times therein of making correspondences between each of plural numbers of the input variables of an arbitrary service, having said plural numbers of the input variables, and plural numbers of the output variables of the other arbitrary service, within the software designing made in the past, in combination with a title of one output of plural numbers of said input variables, a title of the service having said one output, a title of other output differing from said one output of said output variables, and a title of the service having said other output.

With the service-based software designing assistance method, according to the present invention, or applying the apparatus for the same into the service-based software designing, it is possible to obtain the connection combinations between the input of each of the services and the output of other service within the service process flow, semi-automatically, and thereby to lighten or reduce the load on the software designer.

BRIEF DESCRIPTION OF THE DRAWINGS

Those and other objects, features and advantages of the present invention will become more readily apparent from the following detailed description when taken in conjunction with the accompanying drawings wherein:

FIG. 2 is a hardware configuration diagram for showing an example of the hardware structures for executing input/output combination producing program, within the service-based software designing assistance method according to an embodiment of the present invention;

FIG. 3 is a flow chart for showing processing steps of the service-based software designing assistance method, according to an embodiment of the present invention;

FIG. 4 is a view for showing an example of a data format within a service process flow of the software designing assistance method mentioned above;

FIG. 5 is a view for showing an example of a data format of an input/output combination, within a service process flow of the software designing assistance method mentioned above;

FIG. 6 is a view for showing an example of a data format of an input/output direct connection history table, within the software designing assistance method mentioned above;

FIG. 7 is a view for showing an example of a data format of an input/output indirect connection history table, within the software designing assistance method mentioned above;

FIG. 8 is a view for showing an example of a data format of an input variable table, within the software designing assistance method mentioned above; and FIG. 9 is a view foreshowing an example of a data format of an output variable table, within the software designing assistance method mentioned above

DETAILED DESCRIPTION OF THE PREFERRED EMBODIMENTS

Figure 1:
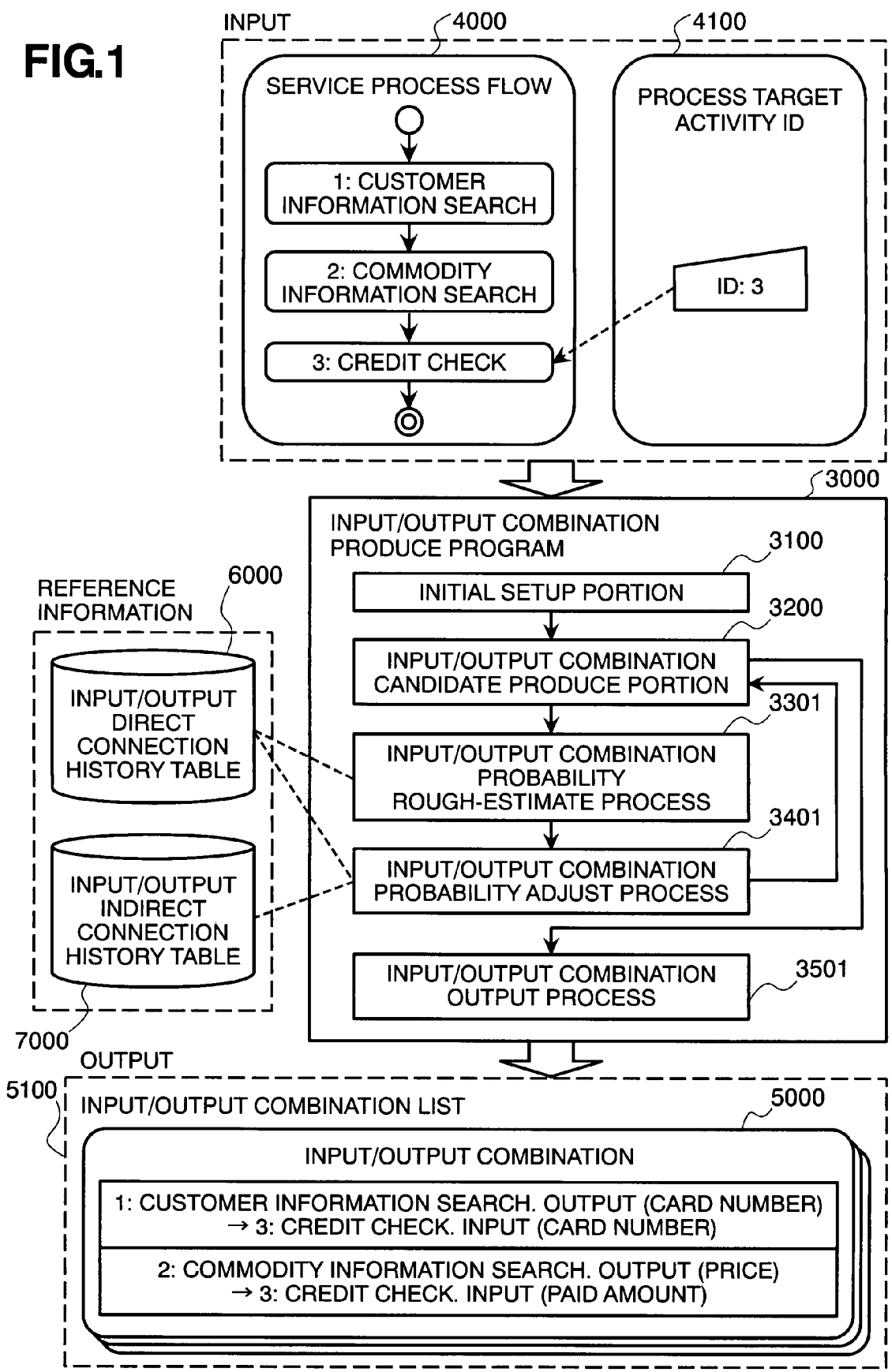
FIG. 1 is a software configuration diagram for showing the structures of software in a system, for executing a service-based software designing assistance method, according to an embodiment of the present invention.

Hereinafter, embodiments according to the present invention will be fully explained by referring to the attached drawings.

First of all, FIG. 1 attached herewith shows the entire structures, including software for executing an assistance method for service-based software designing, according to the present invention.

In this FIG. 1, a service process flow 4000 building up an input is described by a flow language, such as, BPMN or BPEL4WS, etc., as was mentioned above, and as is shown in this figure, a service to be executed, such as, "1: customer information search", "2: commodity information search", "3: credit check", etc., is presented by an activity (i.e., a node), and also a time sequence of the services to be executed is presented by a link having a direction thereof; i.e., a flow describing the steps of operations of software. However, an example of a data format of the service process flow 4000, according to the present embodiment, as is shown in FIG. 4, an activity record 4010 is built up with or comprises: an activity ID 4001 for discriminating an activity uniquely among activities within the said service process flow 4000; a service name 4002 for describing the name of the service to be executed by the said activity; an input variable list 4003, aligning a list of input data names of the services with using a punctuation mark, such as, a comma, for example; an output variable list 4004, aligning a list of output data names of the services also with using the punctuation mark, such as, the comma, for example; and a transition destination activity ID 4005 for designating a transition destination after executing the service mentioned above, wherein the said activity record 4010 is described, repetitively, by a number of pieces of that activities. Further, in those activity records, a record describing "START" in the activity ID thereof represents a staring activity, and a record "END" therein represents an ending activity.

Also in FIG. 1, a process target activity ID 4100, building up the input, is an activity ID in relation to an activity, which should be a target for making the correspondence or relationship on the input variable by an input/output combination produce program 3000, among a plural number of activities within the service process flow 4000 mentioned above, and in the example shown in the figure, it is "ID: 3". Thus, this shows an example, when "3: credit check" is designated and selected, among the service activities mentioned above. However, in more accurate, a target of the input variables, on which the correspondence should be made, is the service, upon which the correspondence was made with the activity mentioned above; however, for simple explanation thereof, consideration is made on the combination of input/output between the activities, hereinafter.

Further, an input/output combination list 5100, which builds up an output shown below in the figure, is made up with repetitive description of an input/output combination 5000, by a number that is outputted by an input/output combination producing program 300, which will be explained hereinafter, i.e., describing the combination between each of the input variables and the activity of providing data to be substituted or assigned for that input variable by a number of the input variables, repetitively, by a number of the input variables of the activities designated by the said process target activity ID 4100, in particular, regarding the activities, which are designated by the process target activity ID 4100 mentioned above (i.e., "3: credit check" of "ID: 3" in the figure), and for example, it is displayed on a display device 2004, which will be described below. In this example, there are shown combinations of the output variable, "1: customer information search. Output (Cardnumber)", and the input variable corresponding thereto, "3: CREDIT CHECK.INPUT(CARD NUMBER)", and the output variable, "2: COMMODITY INFORMATION SEARCH.OUTPUT(PRICE)", and the input variable corresponding thereto, "3: CREDIT CHECK.INPUT(PAID AMOUNT)", as an example.

However, this example of the data format of the input/output combination 5000 is as shown in FIG. 5, i.e., each input/output connection record 5010 is made up with an output service name 5001, which provides the output data, and an output variable name 5002 thereof, an input service name 5003 as a name of the service corresponding to the process target activity ID 4100 mentioned above, and an input variable name 5004, into which the output data mentioned above will be substituted or assigned. And the input/output connection record 5010 is described, repetitively, by the number of the input variables of the service designated by the input service name 5001, and in addition thereof, it is further added with an input/output combination probability 5020, which is calculated by the input/output combination produce program 3000 mentioned above.

Also, an input/output direct connection history table 6000 is that for storing, for example, a number of times that the data obtained from the output variable X of a certain service A is substituted or assigned into the input variable Y of other service B, i.e., the number of times of connecting X directly with Y, in the form of a table, together with the sets of those service and variables thereof, for example, A, X, B and Y, during software constructions made covering over a plural number thereof in the past. Further, an example of the data format of this input/output direct connection history table 6000 is as shown in FIG. 6, i.e., each direct connection history table 6010 is made up with an output service name 6001 as a title of the service providing the output data (corresponding to the service A mentioned above) and an output variable name 6002 thereof as a title of the output variable (corresponding to the output variable X mentioned above), an input service name 6003 as a title of the service (corresponding to the service B mentioned above), into which the output data mentioned above will be substituted or assigned, and an input variable name 6004 as a title of the input variable thereof (corresponding to the variable Y mentioned above), and also a connection number 6005, as a number of time that the combination of the above-mentioned service and the variable was used for software construction. And, the said direct connection record 6010 is described, repetitively, by the number of times of the combinations being in the software constructions made in the past, and further, it is added with a lump sum of the connection number 6005 of all the direct connection records 6010, i.e., a total number of times 6020.

Further, an input/output indirect connection history table 7000 is that for storing, for example, a number of times that the output variable X of the certain service A and the output variable Y of the other service B are substituted or assigned into different inputs P and Q of other service C than those A and B, i.e., the number of times of connecting the variables X and Y, indirectly, via other service(s), in the form of a table, together with the sets of those services and variables thereof, for example, A, X, B and Y, during software constructions made covering over a plural number thereof in the past. Further, an example of the data format of this input/output indirect connection history table 7000 is as shown in FIG. 7, i.e., each indirect connection history table 7010 is made up with a service name A 7001 as a title of one of the services providing the output data (corresponding to the service A mentioned above) and an output variable name A 7002 thereof as a title of the output variable (corresponding to the output variable X mentioned above), a service name B 7003 as a title of the other service providing the output data (corresponding to the service B mentioned above) and an output variable name B 7004 as a title of that output variable (corresponding to the output Y mentioned above), and also a connection number 7005 as a number of times that the combination of the above-mentioned service and the variable was used for software construction. And, the said direct connection record 7010 is described, repetitively, by the number of times of the combinations being in the software constructions made in the past, and further, it is added with a lump sum of the connection number 7005 of all the indirect connection records 7010, i.e., a total number of times 7020.

Next, the input/output combination produce program 3000 is a program for producing an input/output combination list 5100, as an output from an input, including the above-mentioned service process flow 4000 and the process target activity ID 4100, by referring to the input/output direct connection history table 6000 and the input/output indirect connection history table 7000 mentioned above. This input/output combination produce program 3000 is constructed with an initial setup portion 3100 for conducting an initialization of a temporary use data, etc., an input/output combination candidate produce portion 3200 for producing combinations of input/output variables without conflict, comprehensively and sequentially, a connection probability rough-estimate portion 3301 for calculating an input/output combination probability for the combination of the input/output variables, which are produced by the input/output combination candidate produce portion 3200, upon assumption that connection of each of input/output variable is independent, by referring to the input/output direct connection history table 6000, an input/output combination probability adjust process 3401 for conducting adjustment upon the connection probability, which is calculated within the connection probability rough-estimate portion 3301, by referring to the input/output indirect connection history table 7000 and the input/output direct connection history table 6000 mentioned above, and an input/output combination list output process 3501 for outputting a combination of the input/output variables being high in the input/output combination probability.

Next, explanation will be made on an example of a software designing assistance apparatus, hereinafter, as being hardware structures for implementing the service-based software designing assistance method according to the present invention, the software construction of which was explained in the above, by referring to FIG. 2 attached herewith.

In this FIG. 2, the software designing assistance apparatus 200 comprises a processing device 2001, a memory device 2002, an input device 2003, a display device 2004, and a bus 2005 for connecting the respective devices mentioned.

In the structures mentioned above, the processing device 2001 is made of a CPU, MPU, etc., for example, and it reads a group of instructions or commands therein, successively, from the memory device 2002 mentioned above, and thereby conducing calculations or operations corresponding to the instructions or commands read therein. However, in this embodiment, the processing device 2001 reads the above-mentioned input/output combination produce program 3000 therein, from the memory device 2002, thereby to execute it.

On the other hand, the memory device 2002 is made up with a device holding data within an inside thereof, such as, a hard disk device and/or a flash memory, RAM (Random Access Memory), etc., for example. And, this memory device 2002 stores therein, the input/output combination produce program 3000, the service process flow 4000, the process target activity ID 4100, the input/output direct connection history table 6000, and the input/output indirect connection history table 7000, within the present embodiment. Further, this memory device 2002 stored therein, the input/output combination candidates list 2101 mentioned above, an input variable table 2102, and an output variable table 2103, during the processing of the input/output combination produce program 3000, and it also stores the input/output combination list 5100 mentioned above, within the inside thereof, as a result of processing of that input/output combination produce program 3000.

Also, the input device 2004, being made up with, for example, a keyboard, a mouse, a touch panel, a tablet, etc., is that for transmitting an input made by a user to the processing device 2001 mentioned above. However, in the present embodiment, the service process flow 4000 and the process target activity ID 4100, to be the input of the input/output combination produce program 3000, may be a target of the input thereof.

Further, the display device 2005 is made up with, for example, a liquid crystal or a plasma display, a display of cathode ray tube, or a projector, etc., and it conducts presentation upon basis of the instruction or command from the processing apparatus 2001. However, in the present embodiment, the input/output combination list 5100 mentioned above, to be an output of the input/output combination produce program 3000, may be a target of the presentation.

However, within the hardware constructions mentioned above, the explanation was made that, together with the input/output combination produce program 3000 mentioned above, the followings are stored within the same memory device 2002, i.e., the service process flow 4000 and the process target activity ID 4100 building up the input, the input/output direct connection history table 6000 and the input/output indirect connection history table 7000 building up reference information, the input/output combination candidates list 2101, the input variable table 2102 and the output variable table 2103 building up the temporary data, and further the input/output combination list 5100 building up the output. However, the present invention should not be restricted only to this, but for example, the data mentioned above may be stored within the memory devices, respectively, or they may be stored within a memory device of other apparatus, being connected with through a communication circuit.

Explanation will be made on the processes, being distinctive in the service-based software designing assistance method according to the present invention, the hardware structures of which ware explained in the above, i.e., the details of processing steps of the processes of the input/output combination produce program 3000 mentioned above, by referring to FIG. 3.

In brief of the processing of this input/output combination produce program 3000, first of all, after conducting the initial setting in steps 3101-3103 corresponding to the initial setup portion 3100 in FIG. 1, a combination of connection of the input/output variables, which is not within the input/output combination candidates list 2101, within the steps 3201-3202 corresponding to the input/output combination candidate produce portion 3200. And, for this combination of input/output produced, a process for calculating out a probability of combination of input/output is conducted within the connection probability rough-estimate portion 3301 and the input/output combination probability adjust process 3401, repetitively, for all of the combinations of input/output variables without conflict, and thereafter, upon basis of a predetermined criteria, the combination of input/output being high in the connection probability is outputted in the form of the input/output combination 5000, to be executed.

Hereinafter, the detailed steps of processing thereof will be mentioned.

First of all, in a step 3101, the input/output combination candidates list 2101 within the temporary data (see FIG. 2) into an empty. However, the data format of this input/output combination candidates list 2101 is similar or same to that of the input/output combination list 5100 (see FIG. 1); i.e., it describes the input/output combination 5000, and example of the data format of which is show in FIG. 5 mentioned above, repetitively, for an arbitrary number of pieces thereof. And, at the time point of this step 3010, the number of elements thereof (i.e., a number of pieces) is zero (0).

Next, in a step 3102, within the activity record 4010 of the activity (see FIG. 4) that the process target activity ID 4100 designates (see FIG. 1),. the input variable list 4003 is obtained from the service process flow 4000, and each element, being divided by a punctuation mark, is stored into the input variable table 2102 of the memory device 2002 shown in FIG. 2 mentioned above. However, an example of the data format of this input variable table 2102 is as shown in FIG. 8 attached herewith. Thus, each input variable record 8010 is made up with a record number 8001 attached with a series integer starting from one (1) or an arbitrary value, an input variable name 8002 as an element of the input variable list 4003 shown in FIG. 4, and an output variable record number 8003 for recording the correspondence or relationship, temporarily, between the elements of the output variable list 4004, which is also shown in FIG. 4, and it describes the said record number 8001, repetitively, by a number of the elements of the input variable list 4003 within the activity record 4010 of the activity (see FIG. 4) that the process target activity ID 4100 designates. Also, all of output variable record number 8003 are set to "1" (or, the minimum value of the record number 9001 (see FIG. 9) of an output variable table 9000, which will be shown hereinafter), at the time point of this step 3103.

Next, in a step 3103, an activity that can provide an output data to the activity that the process target activity ID 4100 designates, i.e., the output variable list 4004 of the activities laying between a starting activity and the activity that the process target activity ID 4100 designates, is obtained from the said service process flow 4000, and this is stored within the memory device 2002 to be the output variable table 2103 building up the temporary data in FIG. 2 mentioned above. However, this is executed, for each activity record 4010 of the service process flow (see FIG. 4), by obtaining the activity record 4010 that the transition destination activity ID 4005 thereof designates (in this example, the record, the activity ID there of is "2"), successively (however, in that instance, obtaining all of those transition destinations, in case where there are a plural number of the transition destination activity IDs 4005 due to branch and/or parallel, etc.), and repeating a process of tracing a link obtained therewith, successively, and in case when obtaining the activity record 4010 that the transition destination activity ID 4005 designates, by adding each element of the output variable list 4004 (see FIG. 4) within the activity record 4010 becoming a starting point of that link, each being divided by the punctuation mark, being added with the service name 4002 thereof, onto the output variable table 2103 (see the temporary data in FIG. 2 mentioned above). However, an example of the data format of this output variable table 2103 is as shown in FIG. 9 attached herewith. Thus, each output variable record 9010 is made up with a record number 9001 attached with a series integer starting from one (1) or an arbitrary value, a service name 9002, and an output variable name 9003, and that output variable record 9010 is described, repetitively, by the number of the output variables obtained within the step 3103 mentioned above.

Next, in a step 3201 for building up the input/output combination candidate produce portion 3200 mentioned above, check is made on if there is a input/output combination or not, which is not included within the input/output combination candidates list 2101 mentioned above (see the temporary data shown in FIG. 2). However, this is executed, for each record 8010 (see FIG. 8) of the input variable table 2102 within the temporary data mentioned above, by producing the input/output combination 5000 converting the service name 9002 within the output variable record 9010 (see FIG. 9) that the output record thereof designates into the input service name 5001, the variable name 9003 into the output variable name 5002, and also converting the service name 4002 of the activity record 4010 (see FIG. 4) that the process target activity ID 4100 designates into the input service name 5004, and thereby checking on whether the same input/output combination is included or not within the input/output combination candidates list 2101. However, in case when there is no same input/output combination therein ("N" in the figure), as a result thereof, then the process moves into a step 3501, on the other hand, in case when there is ("Y" in the figure), the process mentioned above will be repeated, while increasing the value of the output variable record number 8003 by one "1" each, within the input variable record 8010 (see FIG. 8) being at the minimum in the record number thereof.

Also, in case when the output variable record number 8003 (see FIG. 8) exceeds the maximum value of the record number 9001 (see FIG. 9) of the output variable table 2103, then the said output variable record number 8003 is set at the minimum value within that record number 9001, and at the same time, a process is conducted so as to increase the value only by one "1" of the output variable record number 8003 of the input variable record 8010, which is small in the record number next to that input variable record 8010 that is increasing the output variable record number 8003 at present. Thereafter, the process mentioned above will be repeated until when there is no output variable record number 8003 exceeding the maximum value of the record number 9001. And, when the output variable record number 8003 of the input variable record 8010, the record number 8001 of which is at the maximum, exceeds the maximum value of the record number 9001, determination is made that there is no new combination, and the process moves into the step 3501.

Further, in the step 3202, the input/output combination 5000, being produced in the above-mentioned step 3201, and further confirmed that no same input/output combination is included within the input/output combination candidates list 2101 (see FIG. 2) is added into that input/output combination candidates list 2101.

Next, in the step 3301, upon the input/output combination, which is added in the above-mentioned step 3202, the combination probability is calculated with using the input/output direct connection history table 6000 (see FIG. 1) as the reference information, and a result thereof is stored into the input/output combination probability 5020 (see. FIG. 5) of the input/output combination 5000. This means that, each input/output connection that can be presented by the elements of the input/output connection record 5010 is independent, statistically; thus, it is the probability under the assumption that probability of producing a certain input/output connection does not depend on the presence of other input/output connection. The combination probability mentioned above can be calculated by the following equation.

$$P = \prod_{k=1}^{n} \frac{N(SO_k \cdot O_k \to SI_k \cdot I_k)}{T} \qquad \text{(Eq. 1)}$$

Where, in the equation mentioned above, "P" is the probability of combination to be obtained, and "$SO_k$", "$O_k$", "$SI_k$" and "$I_k$" express the output service name 5001, the output variable name 5002, the input service name 5003 and the input variable name 5004 (see FIG. 5) of the input/output connection record 5010 at $k^{th}$ in the input/output combination 5000, respectively. Also, $N(SO_k \cdot O_k \to SI_k \cdot I_k)$ expresses the connection number 6005 of the direct connection records 6010 being coincident with the input/output direct connection history table 6000, on all items thereof, i.e., the output service name 5001 is coincident with the output service name 6001 (see FIG. 6), the output variable name 5002 with the output variable name 6002, the input service name 5003 with the input service name 6003, and the input variable name 5004 with the input variable name 6004. However, in case there is no direct connection record 6010 fulfilling such the condition, then $N(SO_k \cdot O_k \to SI_k \cdot I_k) = 0$. Also, "T" expresses the total number of times 6020, and "n" the record number of the input/output combination 5000.

Next, in the step 3401, adjustment or compensation is made on the input/output combination probability 5020 (see FIG. 5), which is calculated out in the step 3301 mentioned above, by using the input/output indirect connection history table 7000 and the input/output direct connection history table 6000 as the reference information, and it is stored into the input/output combination probability 5020, again. This is achieved, with adjusting the value, which is calculated on the assumption that each input/output connection is independent statistically, upon basis of a reliance or dependency between the output service and the output variable thereof, providing an output for a certain service. For example, in case there is a positive reliance or dependency between the output service and the output variable thereof, providing the output for the certain service (i.e., in case where one of them appears, then also the other easily appear), the combination probability mentioned above is increased, on the other hand there is a negative reliance or dependency (i.e., in case where one of them appears, then the other hardly appear), the combination probability mentioned above is decreased. However, there is no reliance or dependency between them, it is executed without conduction of the increase or decreases upon the combination probability. However, the adjustment or compensation on the combination probability mentioned above can be calculated by the following equation.

$$P_{modified} = P + \alpha \sum_{i=1}^{n} \sum_{j=1}^{n} \left( \frac{N_l(SO_i \cdot O_i, SO_j \cdot O_j)}{T_l} - \frac{N(SO_i \cdot O_i)}{T} \cdot \frac{N(SO_j \cdot O_j)}{T} \right) \quad (Eq.\ 2)$$

Where, in the equation mentioned above, "$P_{modified}$" is the probability of combination to be obtained, and "$SO_i.O_i$" expresses the output service name 5001 and the output variable name 5002 of the input/output connection record 5010 at $i^{th}$ (see FIG. 5) in the input/output combination 5000. Also, "$N_l(SO_i.O_i,SO_j.I_j)$" expresses the connection number 7005 of the indirect connection records 7010 being coincident with the input/output indirect connection history table 7000, on all items thereof, i.e., "$SO_i$" is coincident with the output service name A 7001 (see FIG. 7), "$O_i$" with the output variable name A 7002, "$SO_j$" with the output service name B 7003, and "$O_j$" with the output variable name B 7004. However, in case there is no indirect connection record fulfilling such the condition, then $N_l(SO_i.O_i,SO_j.I_j)=0$. Also, "$T_l$" expresses the total number of times 7020, and "$\alpha$" a weighting constant predetermined.

However, "$N(SO_i.O_i)$" is a number of times that the output "$O_i$" of the service "$SO_i$" was used as the input of the other service within the software constructions made in the past, and it can be calculated as is shown by the following equation, with using the input/output direct connection history table 6000 as the reference information.

$$N(SO_i \cdot O_i) = \sum_{k=1}^{m} \{N(SOx_k \cdot Ox_k \rightarrow SIx_i \cdot Ix_i) \quad (Eq.\ 3)$$

(in case where $SOx_k = SO_i$ and $Ox_k = O_i$), or 0(in case other than the above)

Where, in the equation mentioned above, $SOx_k$, $Ox_k$, $SIx_k$, and $Ix_k$ express the output service name 6001 (see FIG. 6), the output variable name 6002, the input service name 6003 and the input variable name 6004 of the direct connection record 6000 at $k^{th}$, respectively. Although the equation of "$N (SO_i.O_i)$" is shown herein, however also "$N(SO_j.O_j)$" can be calculated with using a similar equation thereto.

Further, in the step 3501, among the input/output combination 5000, being the elements of the input/output combination candidates list 2101 (see FIG. 2), which is obtained in the steps 3201, 3202, 3301 and 3401 mentioned above, those fulfilling the condition predetermined by the input/output combination probability 5020 thereof are picked up to be the elements of the input/output combination list 5100 of the memory device 2002 mentioned above (see FIG. 2), and the said input/output combination list 5100 is outputted. However, as the predetermined condition mentioned above, there can be considered, such as, extracting a constant number of elements in the order of height of the input/output combination probability 5020, or extracting only the elements showing the value higher than a constant value predetermined by the input/output combination probability 5020, etc.

However, with the software designing assistance method, according to the present embodiment, the details of which was mentioned in the above, there is made no definition of a type, such as, a value of character string or a value of an integer, etc., for example, and also, with this embodiment, no consideration is paid on the time when producing the input/output combination. However, in the place thereof, it is also possible to allow only the combination of the input variable and the output variable, both having the same type, when producing the input/output combination. Also, with the present embodiment, no particular mentioning is made about origins of the service process flow 4000 and the process target activity ID 4100, nor destination of output of the input/output combination list 5100. However, with the service process flow 4000 and the process target activity ID 4100 mentioned above, they may be inputted with using the input device 2003 mentioned above (see FIG. 2), or may be stored within the memory device 2002 in advance, and also with the input/output combination list 5100, it may be only stored within the memory device 2002 mentioned above, but not displayed on the display device 2004.

As was mentioned above, with the software designing assistance method, according to the present invention, the connection relationship between two (2) services in the service process flows, which are produced in the past, are reserved or stored to be the history. However, in that instance, they are stored or reserved for each kind of the connection relationships, i.e., targeting two (2) kinds of relationships, including the direct connection relationship, in which one of the output data becomes the input of the other, and the indirect connection relationship of mode of inputting the output data of two (2) services into the same service. And, when a designer inputs the service process flow describing only the processing order into the software designing assistance system, estimation is made on the input data of the service that the designer designates (or selects) among that service process flow inputted, upon basis of one (1) history about the relationship of connection with the output data of other service(s). However, this estimation is conducted upon the basis of connection probability, in the case where each connection of the input/output data obtained from the direct connection relationship is made independently, and further, it is executed by adding also a cooperative relationship between the output data of the services providing the input data, which can be obtained from the indirect connection relationship mentioned above (i.e., "+" if there is reliance or dependency, or "−" if reversed). Thereafter, the connection obtained from input/output, which is obtained through the processes mentioned above, is presented to the designer. However, this is conducted by presenting the a certain number of connection in the in the order of height of the connection probability, or presenting only the connection(s), the connection probability of which is higher than a threshold value. Further, not only the relationship that the input/output data are connected directly, but also by adding the relationship that it is connected indirectly through a certain service, etc., it is possible to further increase an accuracy of the estimation.

With applying the software designing assistance method, according to the present invention, it is enough for the designer to prepare the service process flow for describing only the execution order of the services, and with this, for the designer, it is possible to obtain the connection combination of the input/output for an arbitrary service within the service process flow, semi-automatically, with an aid of the input/output combination produce program building up the system. Thus, this enables to lighten or reduce the load on the software designer, and also reduce the number of steps in the software designing.

Thus, according to the present invention, first of all, storing the connection histories of the input/output data of the service within the software designing made in the past, when selection is made for the service process flow describing the processing order, in particular, upon an arbitrary service included therein, then the processes are conducted on all of the connection combinations, for selecting the output(s) of other service(s), arbitrarily, which can be connected with all inputs of the service(s) selected, without conflict, and for deriving production probability of combinations of connection between the input and the output mentioned above from the connection histories, and among of those, the connection combination(s) being high in the producing probability thereof is presented to the designer, to be that which seems to be a certain one, thereby lightening or reducing the load on the designer in relation with the connection of the input/output data. And, according to the present invention, with giving high production probability to the input/output data connection, which appears frequently in the connection histories mentioned above, almost of the input/output data connections are those, which are actually used in the software designing made in the past, and therefore it is expected to obtain an appropriate connection combination from a viewpoint of the meaning thereof.

However, in this instance, in particular, in case where there are inputs of the services to be selected in a plural number thereof, since it is possible to consider a case where the input/output data to the respective inputs thereof are not always independent, and also since there can be considered the positive or the negative reliance or dependency between the plural number of connections, therefore it is necessary to store or reserve all the inputs for each service and also the correspondence or relationship between the output of the other service to be connected, for the purpose of calculating out the production probability with accuracy. However, since the number of conducting the software designing is not so large, and it can be considered that it is less than an appropriate number of the combinations of the input/output connections, therefore, there is a possibility that correct estimation cannot be made on the combination of the input/output connection, which is appropriate but is different from the connection histories of the past a little bit.

Then, basically, the connection histories deal the relationship between the service and the output for providing data and the service and the input to use the data, i.e., the relationship of connecting the input/output data directly, and thereby dealing with the problem mentioned above. However, since it is impossible to express the reliance or dependency between the plural number of the connections for the same service, with only that direct connection relationship, therefore not only the direct connection relationship mentioned above, but also the relationship between the outputs of two (2) services is also real with as the connection histories, falling into the relationship of providing the output together with as an input of the same service, i.e., the indirect connection relationship through an input service between the two (2) outputs, and thereby correcting or adjusting the production probability upon basis of the reliance or dependency, which can be obtained from the indirect connection relationship mentioned above.

Thus, with applying the present invention mentioned above into the service-based software designing, if there are software designing histories made in the past and a service process flow describing the execution order of services, it is possible to obtain the connection combinations between the input of each of the services and the output of other service within the service process flow, semi-automatically, and thereby to lighten or reduce the load on the software designer.

While we have shown and described several embodiments in accordance with our invention, it should be understood that disclosed embodiments are susceptible of changes and modifications without departing from the scope of the invention. Therefore, we don not intend to be bound by the details shown and described herein but intend to cover all such changes and modifications that fall within the ambit of the appended claims.

What is claimed is:

1. A service-based software designing assistance method, for assisting designing of software by combining a plurality of services, being parts of software for executing specific functions, the service-based software designing assistance method executed by a processor comprising the following steps of:

registering a direct connection history information including the number of times of connections of making correspondence between an input variable of a first arbitrary service of the plurality of services and an output variable of a second arbitrary service of the plurality of services in software designing done in the past, in combination with a title of the input variable, a title of the output variable, a title of the first arbitrary service having the input variable, and a title of the second arbitrary service having the output variable;

registering an indirect connection history information including the number of times that an output variable X of a first service A and an output variable Y of a second service B are substituted or assigned into different input variables P and Q of a third service C which is different from the first and the second services, and are connected indirectly via the third service C, in the software designing done in the past, in combination with a title of the first service A, a title of the output variable X, a title of the second service B, and a title of the output variable Y;

inputting a service process flow defining a processing order of the plurality of services in combination thereof;

storing one or more input variables of designated one of the services, into an input variable table, targeting the service process flow inputted;

making correspondence one by one between output variables of other services to be processed before the designated service in the service process flow and each of the input variable stored in the input variable table, and storing one or more of the output variables that can be connected into an output variable table;

producing all possible input/output combination candidates of connection between the input variables of the designated service and the output variables in the output variable table;

calculating combination probability that occurs independently for each of the combination candidates produced, based on the number of times of connection registered in the direct connection history information;

adjusting the combination probability calculated for the each of the combination candidates, based on the direct connection history information and the indirect connection history information; and extracting an input/output combination to be outputted, of which the adjusted combination probability satisfies a predetermined condition.

2. A service-based software designing assistance apparatus, for assisting designing of software by combining a plurality of services, being parts of software for executing specific functions, the service-based software designing assistance apparatus comprising:

a memory device, wherein the memory device is configured to store:

a direct connection history information including the number of times of connections of making correspondence between an input variable of a first arbitrary service of the plurality of services and an output variable of a second arbitrary service of the plurality of services in software designing done in the past, in combination with a title of the input variable, a title of the output variable, a title of the first arbitrary service having the input variable, and a title of the second arbitrary service having the output variable; and an indirect connection history information including the number of times that an output variable X of a first service A and an output variable Y of a second service B are substituted or assigned into different input variables P and Q of a third service C which is different from the first and second services A and B, and are connected indirectly via the third service C, in the software designing done in the past, in combination with a title of the first service A, a title of the output variable X, a title of the second service B, and a title of the output variable Y;

an input portion, wherein the input portion is configured to input a service process flow defining a processing order with the plurality of the services in combination thereof, and to accept a selection of an arbitrary service within the service process flow inputted;

a processing device, wherein the processing device is configured:

to store all input variables of the arbitrary service that is selected by the input portion, into an input variable table;

to make correspondence one by one between output variables of other services to be processed in advance of a designated service in the service process flow and each of the input variables stored in the input variable table, and store the output variables that can be connected into an output variable table;

to produce all possible input/output combination candidates of connection between the input variables of the designated service and the output variables in the output variable table;

to calculate combination probability that occurs independently for each of the combination candidates produced, based on the number of times of the connection registered in the direct connection history information; and to adjust the combination probability calculated for each of the combination candidates, based on the direct connection history information and the indirect connection history information; and an output portion, wherein the output portion is configured to output an input/output combination satisfying a predetermined condition, based on the combination probability calculated by the processing device.

* * * * *